March 26, 1963 C. D. GIBSON 3,082,894
LIFT TRUCK REACH MECHANISM
Filed June 9, 1960 4 Sheets-Sheet 1
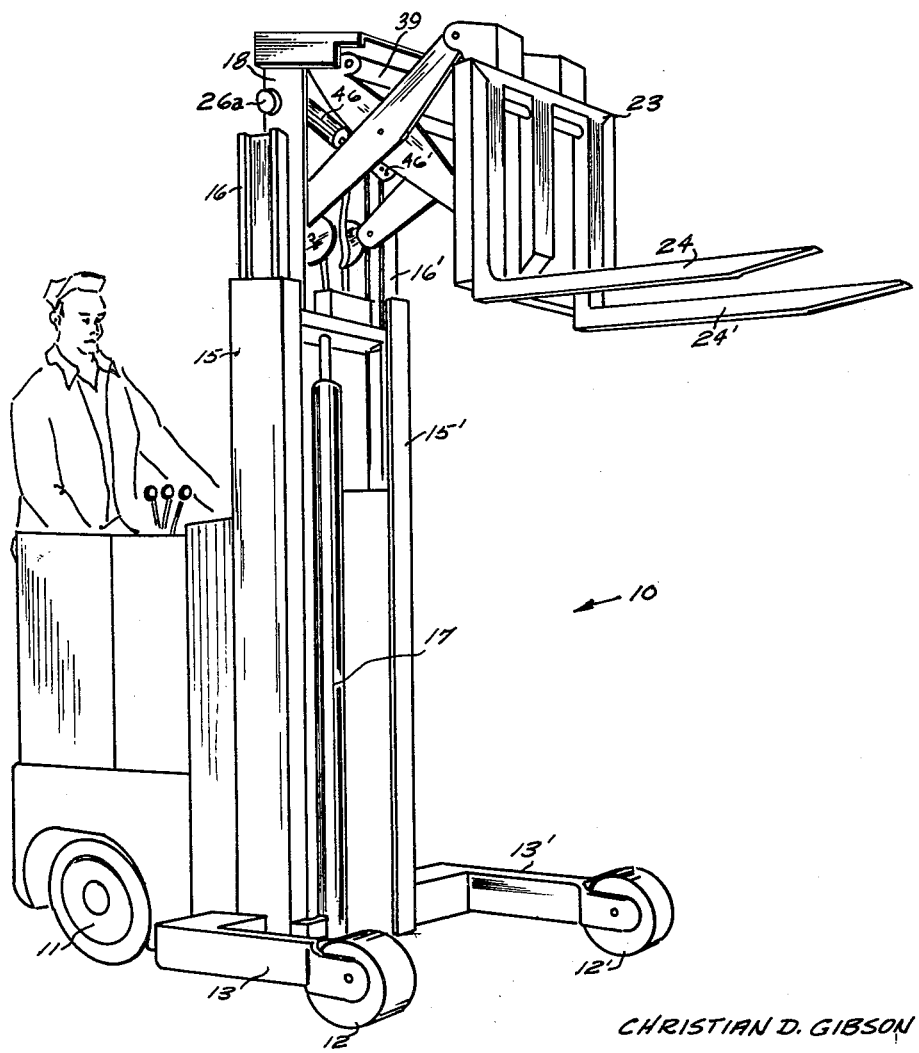
FIG. I
CHRISTIAN D. GIBSON
INVENTOR
BY Richard L. Stephens
ATTORNEY

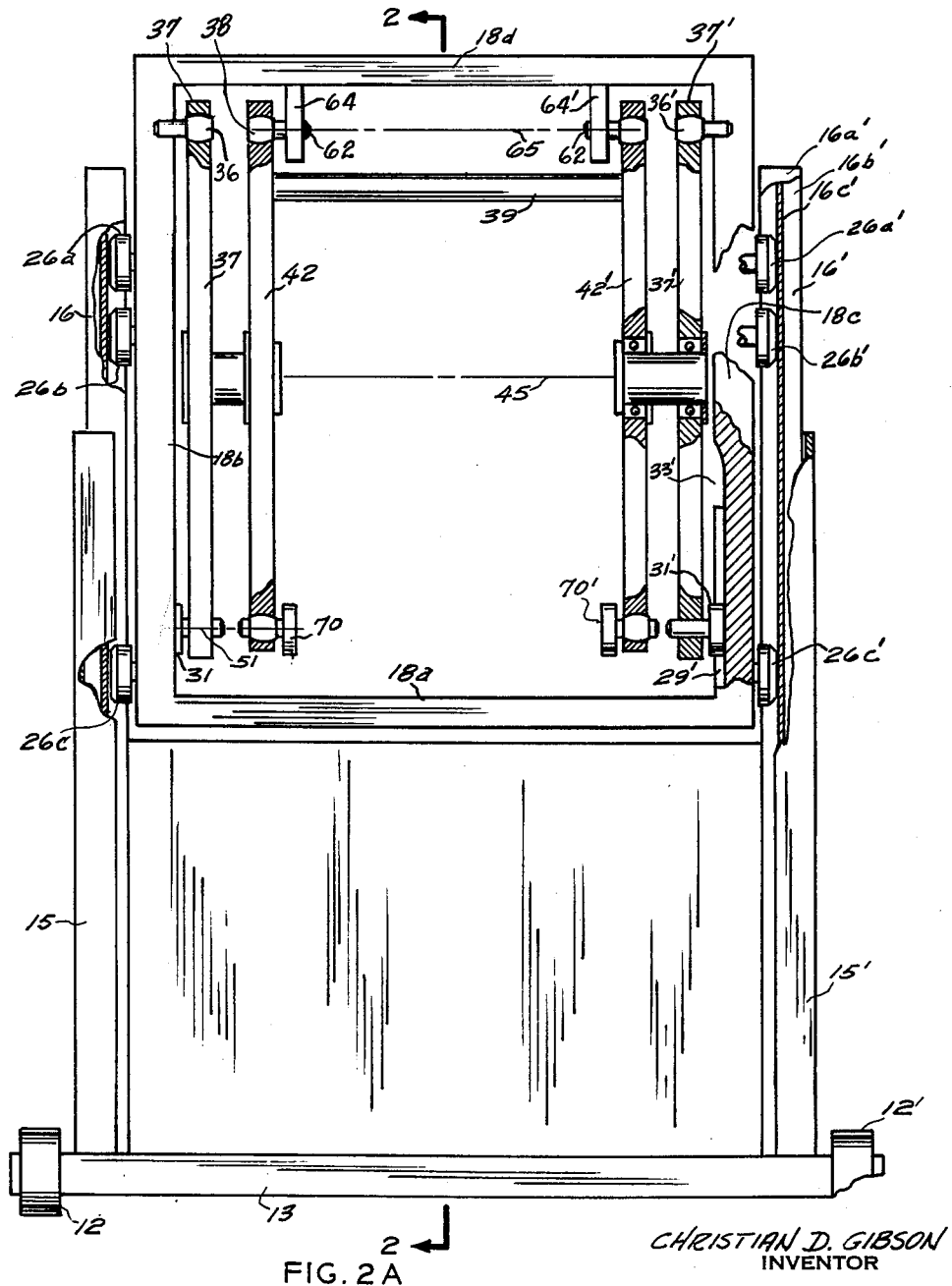

March 26, 1963  C. D. GIBSON  3,082,894
LIFT TRUCK REACH MECHANISM
Filed June 9, 1960  4 Sheets-Sheet 3

CHRISTIAN D. GIBSON
INVENTOR

BY Richard H. Stephens
ATTORNEY

March 26, 1963    C. D. GIBSON    3,082,894
LIFT TRUCK REACH MECHANISM
Filed June 9, 1960    4 Sheets-Sheet 4

CHRISTIAN D. GIBSON
INVENTOR

BY Richard G. Stephens
ATTORNEY

United States Patent Office 3,082,894
Patented Mar. 26, 1963

3,082,894
LIFT TRUCK REACH MECHANISM
Christian D. Gibson, Greene, N.Y., assignor to The Raymond Corporation, Greene, N.Y., a corporation of New York
Filed June 9, 1960, Ser. No. 34,935
6 Claims. (Cl. 214—730)

This invention relates to material handling trucks of the class in which a mast, mounted upon a wheel-supported base, is provided with a load carriage arranged to travel vertically thereon between load pick-up and load discharge positions, and in which reach mechanism is provided to move the load horizontally to and from the mast, which remains fixed to the wheel-supported base. More particularly, the present invention may be regarded as an improvement upon the material handling lift truck shown in my prior Patent No. 2,752,058, granted June 26, 1956, and assigned to the same assignee as the present invention.

The basic invention of Pat. No. 2,752,058 combines in one truck the advantage of both counterbalanced trucks and straddle trucks. The skid or pallet pick-up means, e.g. forks, are so arranged that, in a truck having much of the base in front of the mast and its front supporting wheels substantially at its front end, the load forks may be projected into or retracted out of a pallet or skid, without disturbing the projection of the mast. By providing means with which a load being lifted may be retracted in toward the center of the truck, so that the center of gravity of the load lies within, or not far outside, the wheel base of the truck, the heavy counterbalancing ordinarily required in the usual counterbalanced truck is made unnecessary.

In order to allow very narrow aisle tiering of loads it is necessary that the truck be made very maneuverable, and that the reach mechanism retract as far as possible so as to minimize the overall longitudinal dimension of truck and load. Desirably, the reach mechanism should be sturdy enough to handle heavy loads, long enough to provide sufficient longitudinal translation of the load forks, and it also should collapse as much as possible when retracted, so as to lie completely between the uprights forming the truck mast, so that the overall truck length may be made as small as possible, which increases maneuverability.

In prior art reach fork trucks of the type described, the load carriage consists of a large frame surrounding the reach mechanism mounted essentially in front of the uprights forming the mast. In their most retracted position the levers or scissors arms forming the reach mechanism arms lie longitudinally outside, i.e., in front of, the uprights. In the present invention, however, the large surrounding frame has been completely eliminated, and the reach levers retract so as to lie completely, in a longitudinal sense, between the uprights. The new arrangement requires that the uprights be spaced slightly wider apart but this is not an appreciable limitation. The arrangement of the present invention is appreciably simpler.

In the instant invention stresses are communicated more directly through the parts, the scissor arms of the invention are shorter and lighter for a given amount of reach and a given load capability, and the overall carriage height is appreciably lessened due to the decreased reduction in the length of the reach mechanism scissor arms.

In the prior art mechanism, the range over which the fork would be adjusted, i.e. the distance between maximum projection and maximum retraction, was limited to be no more than the distance between the levers. In the present invention there is not such a limitation. The levers or scissor arms are mounted laterally with respect to each other and hinged so that arm ends do not merely approach each other, but instead actually pass each other during retraction, considerably increasing the range of fork travel, i.e., the reach distance, for a given length of lever, or alternatively, allowing use of a shorter (and hence lighter and stiffer) lever for a given required range of fork travel.

Thus it is a primary object of the present invention to provide an improved reach mechanism for an industrial material handling vehicle. It is a more specific object of the invention to provide a reach mechanism having an increased ratio between its reach distance and the space it requires at full retraction.

It is a further object of the invention to provide an improved reach mechanism in which lesser stresses are imparted to certain parts, so that such parts may be formed more economically from lighter material.

Other objects of the invention will in part be obvious and will in part appear hereinafter.

The invention accordingly comprises the features of construction combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 1 is a perspective view of a typical industrial material handling truck equipped with the improved reach mechanism which is the subject of the present invention.

FIG. 2a is a view facing the truck, looking rearwardly toward the reach mechanism from a position in front of the truck with the reach mechanism retracted so as to lie between the mast uprights, and with the fork carriage of the truck removed to facilitate illustration;

Figure 2B:
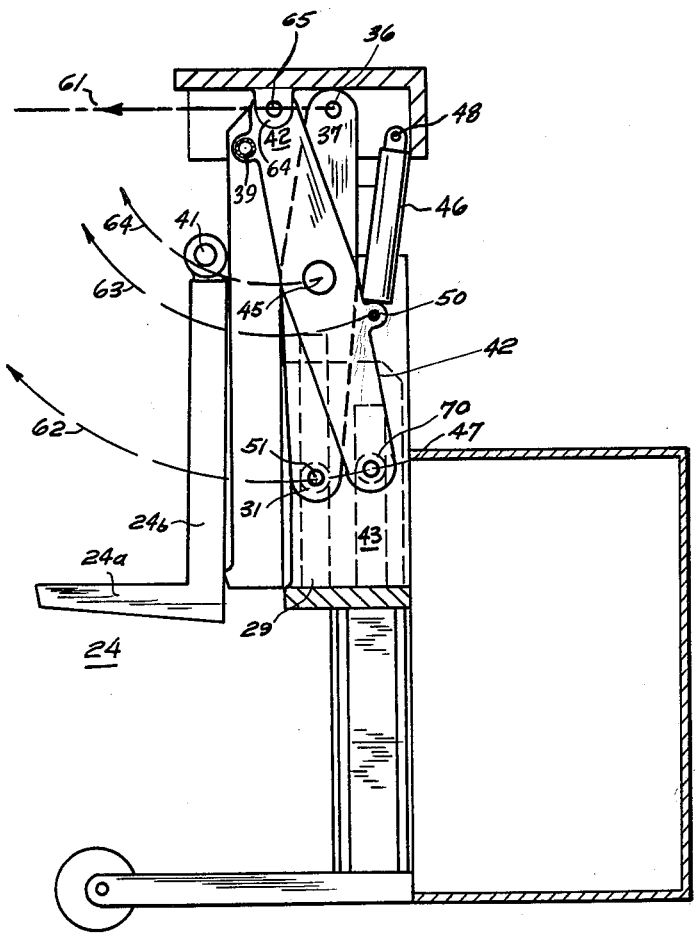
FIG. 2b is a section view taken along line 2—2 in FIG. 2a, but with the fork carriage assembly, which was omitted from FIG. 2a, shown in position.

FIG. 1 shows the general arrangement of one embodiment of lift truck employing the invention. The truck 10 comprises a base frame upon which are mounted one or more dirigible drive wheels 11, and a pair of non-steerable load-carrying front wheels 12, 12' mounted on straddle arms 13, 13' which project forwardly from the base of the truck. An operator's platform, various control apparatus and the truck electrical storage battery are all carried on the main base frame of the truck, together with a mast or gallows formed by a pair of spaced apart inwardly facing channel members 15, 15'. A pair of telescopic uprights shown as comprising I shapes 16, 16' are nested within channels 15, 15' and are hoisted and lowered by means of hydraulic cylinder 17. A rectangular frame or carriage 18 is carried on rollers 26a, 26b, 26c, 26a', 26b' and 26c' within tracks formed by the inner flanges of I beams 16, 16', and a pair of further hydraulic cylinders (not shown) serve to raise and lower carriage 18 with respect to telescopic I-shape uprights 16, 16'. Mounted to carriage 18 by means of two fixed pivotal connections and two slidable pivotal connections are four ends of a scissors reach mechanism, the other ends of which are connected to fork carriage 23, in which are hung conventional load forks 24, 24'. A pair of double-acting hydraulic cylinders 46, 46' are connected between carriage frame 18 and two arms of the scissors reach mechanism, so that actuation of cylinders 26, 26' serves to extend and retract forks 24, 24', in a direction which is longitudinal with respect to the truck and perpendicular to the length of mast members 15, 15', and horizontal when the truck is level.

FIG. 2a is a view facing the truck, looking rearwardly toward the reach mechanism from a position in front of the truck, with the reach mechanism retracted so as to lie between mast uprights 15, 15' and with the fork carriage 23 of the truck removed to facilitate illustration. The mast or gallows comprises two vertical channels 15, 15' having their open sides facing inwardly toward each other are spaced apart on the floor 13 of the truck in conventional fashion. I-shapes 16, 16' extending most of the length of channels 15, 15' are nested within channels 15 and 15' to form a telescoping carriage hoist assembly. In extending the device to lift a load to maximum height, a load carriage 18 carried on I-shapes 16, 16' in manner to be described first is hoisted to the upper end of I-shapes 16, 16', by means of a first hydraulic actuator comprising a pair of hydraulic cylinders, and then shapes 16, 16' are themselves hoisted up by means of a second hydraulic actuator 17, neither actuator being shown in FIG. 2a. Front flange 16a' and rear flange 16b' and web 16c' form a track for rollers 26a', 26b' and 26c' and similar rollers 26a, 26b and 26c slide up and down inside the track formed by I-beam 16, as carriage 18 is raised and lowered. When the truck is level, channels 15, 15' and I-beams 16, 16' all are vertical.

The three rollers on each side of carriage 18 are carried on stub shafts mounted as shown along both sides of rigid carriage 18. Carriage 18 comprises a base member 18a, two vertical side members 18b, 18c, and a top member 18d, all welded together to form a rigid rectangular frame. Side members 18b and 18c are provided with recessed vertical slots 29, 29', which accommodate rollers 31, 31', for a purpose to be described below. The wall of slots 29, 29' are cut away, as at 33' to allow roller 31' to be inserted in slot 29' during assembly. It will be noted that the assembly shown in FIG. 2a is symmetrical about centerline Y—Y, so that a detailed description of only one side of the apparatus will be sufficient. In FIG. 2a, prime numbers have been assigned to parts on the left side of the truck (the right side of FIG. 2a) and unprimed numbers refer to similar parts on the right side of the truck, some of which are not shown in detail for sake of clarity.

The shaft of roller 31 carries the lower end of right outer scissors arm 37, which is pivotally affixed to right inner arm 42 to a scissors pivot axis 45. The upper end of inner arm 42 is attached to swing about a fixed pivot axis 65 by means of a stub shaft 62 mounted in a bearing 64 which is rigidly attached to top member 18d of frame 18. Right inner arm 42 is rigidly connected by pipe stiffener 39 to left inner arm 42', the upper end of which also is arranged in similar fashion to pivot about fixed pivot axis 65. Left inner arm 42' is pivotally attached on scissors pivot axis 45 to left outer arm 37'. Roller 31' on the lower end of arm 37' rides up and down in slot 29' as the mechanism is extended and retracted, and roller 31 on the lower end of right outer arm 37 rides up and down in slot 29 as the reach mechanism is extended and retracted. It should be recalled that load fork carriage 23 and forks 24, 24' are removed in FIG. 2a. When assembled, as will presently be pointed out, the upper ends of outer arms 37, 37' connect to fixed pivots at the top of load fork carriage 23, and the lower ends of arms 42, 42' carry rollers 70, 70' which pivot and slide in vertical guide slots in the load fork carriage.

Figure 2C:
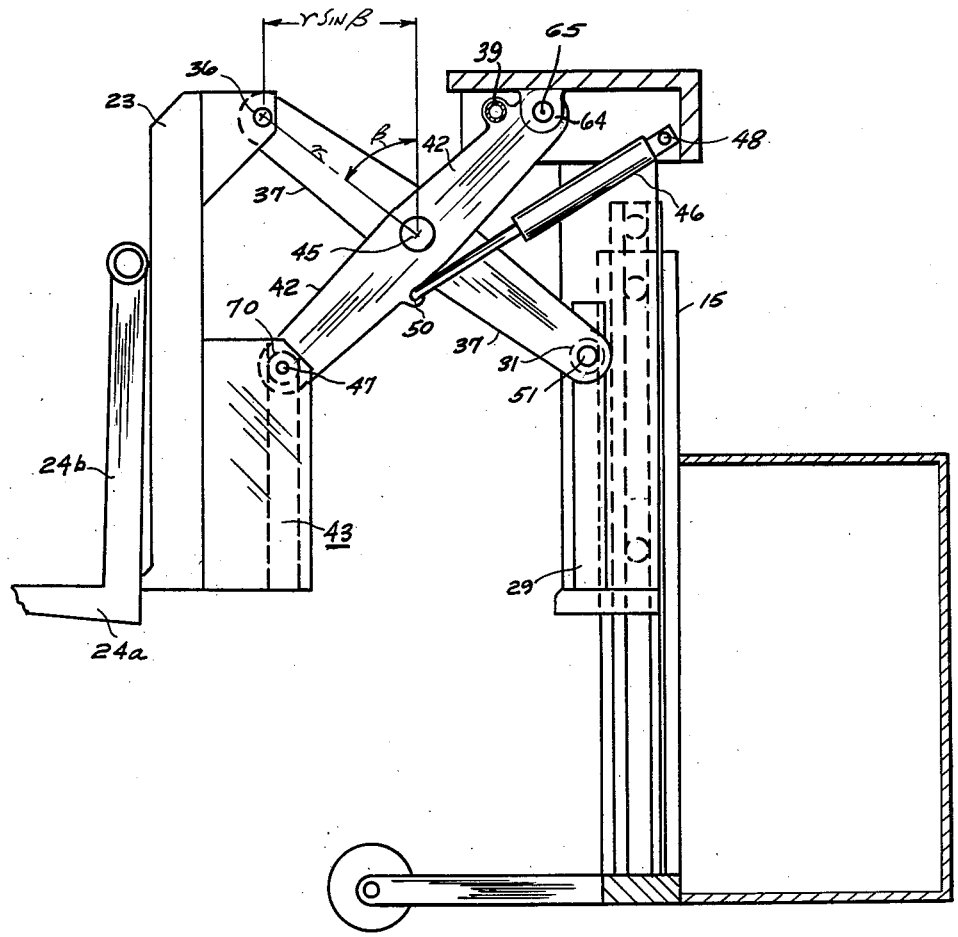
FIG. 2c is a section view similar to FIG. 2b, but in which the reach mechanism is shown in its maximum extended position.

By reference to FIGS. 2b and 2c, which are sections taken along 2—2 in FIG. 2a, one may understand the motions of various parts of the invention as the mechanism is extended and retracted. In FIG. 2c the invention is shown in the maximum extended position, and in FIG. 2b in the maximum retracted position. The fork carriage assembly omitted for convenience in FIG. 2a is shown in position in FIGS. 2b and 2c.

Lift fork 24 includes a horizontal partially tapered fork 24a and a vertical arm 24b hung from bar 41, which is fastened to fork carriage 23. Fork carriage 23 is provided with a pivot at 36 at which outer arm 37 is pivotally connected, and with a generally vertical slot at 43, in which is disposed roller 70 rotatably supported on inner arm 42 at 47. Outer arm 37 and inner arm 42 are pivotally connected together at 45. Double-acting hydraulic actuator 46 is connected to the frame at pivot point 48 inside the uprights near their rearward side, and to a pivot point 50 on inner arm 42. For convenience in understanding, arrows have been added to FIG. 2b to illustrate the paths described by various parts as the reach mechanism is extended.

As pressure is applied to hydraulic cylinder 46 and it expands, pivot 36 moves horizontally to the left as viewed in FIG. 2b, along line 61. Simultaneously, pivot point 47 swings outwardly along circular arc 62, arm 42 being pivotally attached to frame 18 at 65, so that the radius of curvature of arc 62 corresponds to the active length of arm 42. As arm 42 is urged outwardly by hydraulic cylinder 46, roller 70 rides downwardly in slot 43, and simultaneously, of course, roller 70' rides downwardly in similar fashion. If desired, the distance between the center of pivot 45 and pivot 47 may be made slightly more than the distance between pivot 45 and pivot 36 of arm 37, with the result that pivot 47 will be located slightly further to the left than pivot 36 when the reach mechanism is extended. The horizontal portion 24a of fork 24 is rigidly mounted perpendicularly to slots 43, 43', so that the location of pivot 47 very slightly to the left of pivot 36 will cause fork 24a to tend to slope very slightly upwardly when the truck is level, so that fork deflection with a given load will cause the fork to be substantially horizontal. Since fork deflection is small, the horizontal distance between pivots 36 and 47 and the difference in lengths of arms 37 and 42 from pivot 45 is small, and for convenience in understanding the principal features of the present invention, the remainder of the description of FIG. 2 will neglect this small refinement, which is only optionally included in any given embodiment of the invention.

Continuing the description of extension of the mechanism, actuator 46 pushes inner arm 42, which is fixedly pivoted at 65, so that rod end 50 of the hydraulic actuator moves along circular arc 63, and pivot 45, which pivotally connects outer arm 37 to inner arm 42, moves along circular arc 64. Simultaneously, roller 31 pivoted at 51 moves upwardly in vertical slot 29 in the frame. Extension continues all the way to the position shown in FIG. 2c.

An important distinction of the present invention is that outer arm 37 does not hit stops or interrupt its travel during retraction so as to prevent pivot 36 from moving as far as pivot 65. In fact, the mechanism retracts with angle β approaching zero, i.e. so that arms 37 and 42 are lined up together, but then retraction continues, with pivot point 36 moving to the right, on past fixed pivot 65, so that the angle β begins to increase negatively.

Referring now to FIG. 2c, it will be seen that the amount D which the reach mechanism has been extended from the retracted position where pivots 36 and 65 are aligned, which for convenience may be termed the "zero position," may be expressed as follows:

$$D = 2r \sin \beta \tag{1}$$

Differentiating $$\frac{dD}{d\beta} = 2r \cos \beta \tag{2}$$

Reach distance D will be seen to depend upon the sine function of the angle β. Since the slope of the sine function, i.e. the cosine function, is greatest near zero, it will be seen that operation of the mechanism within ranges where β angles are small gives the greatest reach per degree, and if the angle β were allowed to approach ninety degrees, there would be no additional reach obtained. Equation 1 above also indicates that maximum reach is directly proportional to arm length (shown as 2r in FIG. 2c).

Further consideration of FIG. 2c will reveal that the stress F in arm 42 between pivots 65 and 45 caused by a load W on the forks may be expressed as:

$$F = \frac{W}{\cos \beta} \quad (3)$$

This equation illustrates that the stress approaches infinity as $\beta$ approaches ninety degrees. Obviously, then, the angle $\beta$ must be maintained well below ninety degrees, and it will be clear that lighter arms may be used to handle a given load if the $\beta$ angle is maintained as small as possible during operation.

In the prior art reach mechanism of my prior Pat. No. 2,752,058, the pivot point corresponding to point 36 herein was not able to travel back as far as the pivot point corresponding to 65 herein, so that values of the angle $\beta$ between zero and perhaps five degrees, were not obtainable. By slight modifications to my previous system, angles reaching zero can be obtained without the exercise of invention. In the present invention, however, not only can point 36 coincide with point 65, so that the five degrees to zero degrees range is utilized, but it can go past point 65, through a range of negative values of the angle $\beta$. Thus the present invention utilizes the efficient low $\beta$ angle range which provides maximum reach efficiency and maximum stress. Having greater reach efficiency, shorter arms may be used than may be used with prior mechanism to provide the same amount of reach. Shorter arms inherently are stronger and may be made of lighter stock, but the lowered stresses due to lower $\beta$ angle even further decrease the stresses in the reach mechanism of the present invention.

A further advantageous feature of the invention is the fact that actuator 46 acts with substantially the same lever arm distance throughout the entire range of operation, which may be understood readily from FIG. 2c, wherein the actuator line of action, the line passing through pivots 48 and 50, remains substantially the same distance from pivot 65, regardless of whether the reach mechanism is fully extended, fully retracted, or at some intermediate position. This insures that the mechanism will extend and retract smoothly without binding, and at substantially a constant speed for a given pressure applied to the reach mechanism hydraulic cylinders.

The right vertical channel or "upright" forming the mast of the truck is indicated at 15 in FIG. 2c, and as mentioned above, the reach mechanism, when retracted, is nested between the uprights. In order to allow more travel of pivot 36 past pivot 65 on retraction, pivot 65 is located near the forward edge of the uprights and pivot 36 is designed to travel to near the rear edge of the uprights. In the fully retracted position, scissors pivot 45 lies near the centerline of the upright structure in a longitudinal sense. Since pivot points 36, 45 and 51 lie in a straight line on arm 37, retraction of point 36 to near the rear edge of the uprights and location of scissors pivot 45 near the centerline, require that pivot point 51 lie near the forward edge of the uprights when the mechanism is fully retracted. Since pivot points 65, 45 and 47 lie in a straight line along arm 42, location of fixed pivot 65 near the front edge of the uprights and location of scissors pivot 45 near the centerline require that pivot point 47 lie near the rear edge of the uprights when the mechanism is fully retracted.

From the foregoing it will be seen that the improved reach mechanism, while being sturdy and providing the required reach, collapses so as to occupy much less space than prior art reach mechanisms, and furthermore, less stress is applied to certain parts of the mechanism than with prior mechanisms.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

While the scissors mechanism is illustrated as embodying fixed upper pivots and slidable lower pivots, it alternatively may utilize the inverse arrangement without departing from the invention.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A reach mechanism for use on a material handling device, said mechanism being connected between a base member and a reciprocating load-carrying device and operative to retract and extend said device to and from said frame, said mechanism comprising, in combination: an inner scissors arm assembly, comprising left and right scissors arms, said assembly having upper, lower and central pivot axes, all of said pivot axes being mutually parallel and each axis passing through both of said inner scissors arms; an outer scissors arm assembly comprising left and right scissors arms, said assembly having upper, lower and central pivot axes, all of said pivot axes being mutually parallel and each axis passing through both of said outer scissors arms; a load carriage frame having bearing means for fixedly mounting said upper pivot axis of said inner scissors arm assembly and having a first pair of vertical guide means; means affixed to said load-carrying device for pivotally mounting said upper pivot axes of said outer scissors arm assembly and having a second pair of vertical guide means; bearing means at said lower pivot axis of said inner scissors arms mounted to reciprocate in said second pair of vertical guide means; bearing means at said lower pivot axis of said outer scissors arms mounted to reciprocate in said first pair of vertical guide means; scissors pivot means pivotally connecting together the left arms of said scissors assemblies and connecting together the right arms of said scissors assemblies; and double-acting motive means connected between said load carriage frame and said inner scissors assembly and operative to extend and retract said load carrying device, said upper pivot axis of said inner scissors arm assembly being journalled forwardly of said first pair of vertical guide means and the arms of said outer scissors arm assembly being spaced apart a distance greater than the width of said inner scissors arm assembly so that said upper pivot axis of said outer assembly may pass said upper pivot axis of said inner assembly as said mechanism is extended and retracted.

2. A reach mechanism for use on a material handling truck having a mast and a carriage slidable up and down said mast, said mechanism being connected between said carriage and a rectilinearly reciprocating load support and operative to retract and extend said device to and from said mast, said mechanism comprising in combination: first and second pairs of rigidly cross-connected scissors arms so pivotally interconnected that one pair swings between the other pair into and out of and past nested relation thereto, the outer pair having at one end outwardly extending sliding pivotal connections with inwardly opening guides in the sides of the carriage frame and having at its other end fixedly located pivotal connections with said load support, the inner pair having at one end inwardly extending-sliding pivotal connections with outwardly opening guides in said load support and having at its other end fixedly located pivotal connections with said carriage, said inwardly opening guides in the sides of said carriage frame being longitudinally offset with respect to said fixedly located pivotal connections with said carriage, whereby said arms may retract to a position past where said arms are aligned with each other, and so that said fixedly located pivotal connections to said load support may travel past said fixedly located pivotal connections to said carriage as said load support is extended and retracted.

3. A reach mechanism for use on a material handling truck having a vertical mast and a carriage slidable up and down said mast, said mechanism being connected to extend and retract a load support in a longitudinal direction substantially perpendicular to said mast, said mast comprising a pair of spaced-apart vertical uprights and said carriage being situated in a longitudinal sense substantially between said uprights, said mechanism being capable of being retracted sufficiently so as substantially not to protrude in a longitudinal direction outside said carriage, said mechanism comprising in combination: inner and outer scissors arms assemblies, said inner arms being pivotally connected to said outer arms and spaced in between said outer arms; a first pair of vertical guide means on said carriage and a second pair of vertical guide means on said load support, the first ends of said outer and inner arms being slidably and pivotally connected in said first and second pairs of vertical guide means, respectively; a first pair of pivot points fixedly located with respect to said carriage and a second pair of pivot points fixedly located with respect to said load support, the second ends of said inner and outer arms being pivotally connected at said first and second pairs of pivot points; said first pair of pivot points being spaced longitudinally outwardly with respect to said first pair of vertical guide means, whereby said second pair of fixed location pivot points may travel past said first pair of fixed location pivot points as said load support is extended and retracted.

4. Mechanism according to claim 3 including double-acting hydraulic ram motive means pivotally connected to said inner arms and said carriage, and operative to extend and retract said load support by rotating said inner arms about said first pair of fixed-location pivot points.

5. Mechanism according to claim 3 including a rigid connecting member extending between said inner arms and rigidly spacing and connecting together said inner arms at a point near their fixed pivot connection to said carriage.

6. Mechanism according to claim 3 in which said carriage comprises a rigid frame having left and right vertical side members in which said first pair of vertical guide members are disposed, said vertical side members also carrying a plurality of outwardly extending roller means engaging said mast to guide said carriage up and down said mast.

References Cited in the file of this patent
UNITED STATES PATENTS
2,752,058   Gibson _____ June 26, 1956